(12) United States Patent
Hunter

(10) Patent No.: US 9,118,499 B2
(45) Date of Patent: Aug. 25, 2015

(54) MONITORING SYSTEM FOR PROACTIVE SERVICE OF DEVICES

(75) Inventor: Jim Hunter, Sunnyvale, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 334 days.

(21) Appl. No.: 13/087,768

(22) Filed: Apr. 15, 2011

(65) Prior Publication Data

US 2011/0258314 A1    Oct. 20, 2011

Related U.S. Application Data

(60) Provisional application No. 61/324,688, filed on Apr. 15, 2010.

(51) Int. Cl.
  *G06F 15/173*    (2006.01)
  *H04L 12/28*     (2006.01)

(52) U.S. Cl.
  CPC ........ *H04L 12/2825* (2013.01); *H04L 12/2823* (2013.01); *H04L 12/2834* (2013.01)

(58) Field of Classification Search
  USPC ........................................................ 709/224
  See application file for complete search history.

(56) References Cited

U.S. PATENT DOCUMENTS

| 7,423,546 B1 | 9/2008 | Aisa |
| 2001/0025349 A1* | 9/2001 | Sharood et al. ................ 713/340 |
| 2005/0171645 A1 | 8/2005 | Oswald et al. |
| 2007/0255460 A1* | 11/2007 | Lopata .......................... 700/293 |

FOREIGN PATENT DOCUMENTS

| EP | 0550263 A2 | 7/1993 |
| JP | 2003196773 A | 7/2003 |
| WO | 03/044923 A2 | 5/2003 |
| WO | 2007/054914 A2 | 5/2007 |

OTHER PUBLICATIONS

PCT Search Report & Written Opinion, RE: Application # PCT/US2011/032740: Jul. 20, 2011.

* cited by examiner

*Primary Examiner* — El Hadji Sall

(57) ABSTRACT

In one embodiment, a method for monitoring operation of a device is provided. Monitoring of the device at a source using a gateway is activated. The device is coupled to the source to receive power from the source for operation of the device. The gateway monitors an electrical characteristic of the source coupled to the device. Monitored information of the electrical characteristic is captured from the source when an event occurs at the device. The monitored information is correlated as being associated with the device. The monitored information is used in an analysis to analyze whether a variance in the monitored information violates a threshold to trigger an indication of a problem in the operation of the device.

20 Claims, 8 Drawing Sheets

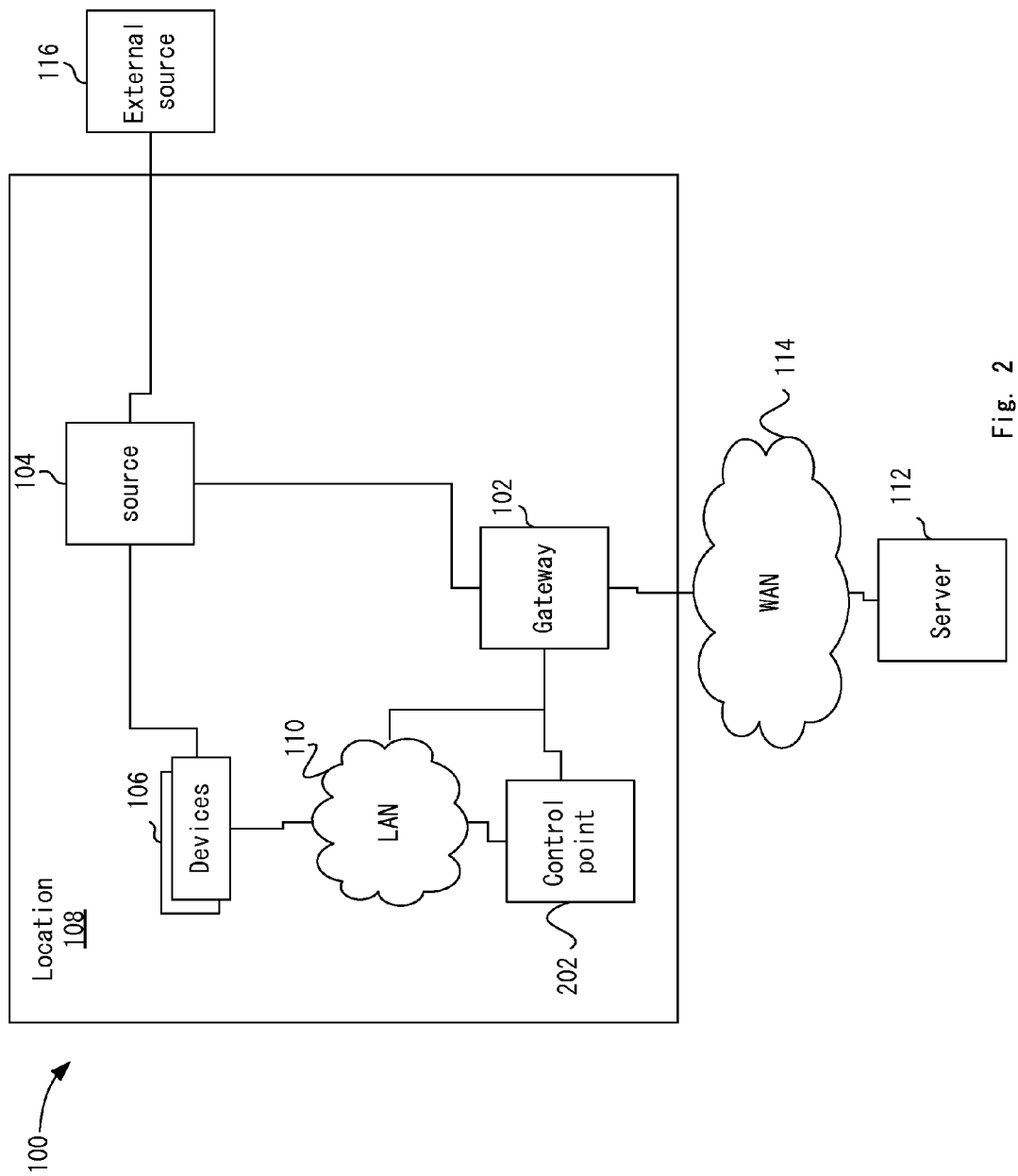

MONITORING SYSTEM FOR PROACTIVE SERVICE OF DEVICES

CROSS REFERENCE TO RELATED APPLICATIONS

The present application claims priority to U.S. Provisional App. No. 61/324,688 for "Smart Warranty—The Use of Technology in Business Process to Monitor and Maintain Devices in the Field" filed Apr. 15, 2010, the contents of which is incorporated herein by reference in their entirety.

BACKGROUND

Particular embodiments generally relate to monitoring of devices.

A warranty is used to guarantee the operation of a device. For example, when a device fails during a warranty period, the product may be repaired or replaced based on the terms of the warranty. The process of repair may involve notifying a service company to troubleshoot and repair the product at the point of failure. Or, in other cases if the product cannot be repaired, a new product is provided to a user. In both cases, cost to repair or replace the product is incurred by the company providing the warranty. Further, the user may not have use of the product while the product is being repaired or a new product is being shipped, which inconveniences the user.

Typically, the product is used until the product fails. Then, the user has to contact a company to receive the repair or replacement that is covered by the warranty. By having the warranty be invoked after the failure of the product, the user's perception of the product may be damaged. For example, the user may not recommend the device to other people due to the failure even if the warranty covered the repair or provided a replacement.

Accordingly, a solution is desired to proactively monitor the device before failure.

SUMMARY

In one embodiment, a method for monitoring operation of a device is provided. Monitoring of the device at a source using a gateway is activated. The device is coupled to the source to receive power from the source for operation of the device. The gateway monitors an electrical characteristic of the source coupled to the device. Monitored information of the electrical characteristic is captured from the source when an event occurs at the device. The monitored information is correlated as being associated with the device. The monitored information is used in an analysis to analyze whether a variance in the monitored information violates a threshold to trigger an indication of a problem in the operation of the device.

In one embodiment, the monitored information is sent to a server through a network. The server analyzes the monitored information to determine if the variance in the monitored information violates the threshold.

In one embodiment, the source includes a power source coupled to the device to provide power to the device.

In one embodiment, the source is monitored by the gateway at a point separate from the device.

In one embodiment, a plurality of devices are coupled to the source and the monitored information is correlated to device from the plurality of devices based on the monitored information being correlated to the event.

In one embodiment, an apparatus is configured to monitor operation of a device. The apparatus includes one or more computer processors and a computer-readable storage medium including instructions for controlling the one or more computer processors to be operable to: activate monitoring of the device at a source, wherein the device is coupled to the source to receive power from the source for operation of the device; monitor an electrical characteristic of the source coupled to the device; capture monitored information of the electrical characteristic from the source when an event occurs at the device; and correlate the monitored information as being associated with the device, wherein the monitored information is used in an analysis to analyze whether a variance in the monitored information violates a threshold to trigger an indication of a problem in the operation of the device.

In one embodiment, a non-transitory computer-readable storage medium contains instructions for monitoring operation of a device. The instructions control a computer system to be operable to: activate monitoring of the device at a source, wherein the device is coupled to the source to receive power from the source for operation of the device; monitor an electrical characteristic of the source coupled to the device; capture monitored information of the electrical characteristic from the source when an event occurs at the device; and correlate the monitored information as being associated with the device, wherein the monitored information is used in an analysis to analyze whether a variance in the monitored information violates a threshold to trigger an indication of a problem in the operation of the device.

The following detailed description and accompanying drawings provide a better understanding of the nature and advantages of the present invention.

BRIEF DESCRIPTION OF THE DRAWINGS

FIG. 2 depicts a more detailed example of system according to one embodiment.

DETAILED DESCRIPTION

Described herein are techniques for a device monitoring system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
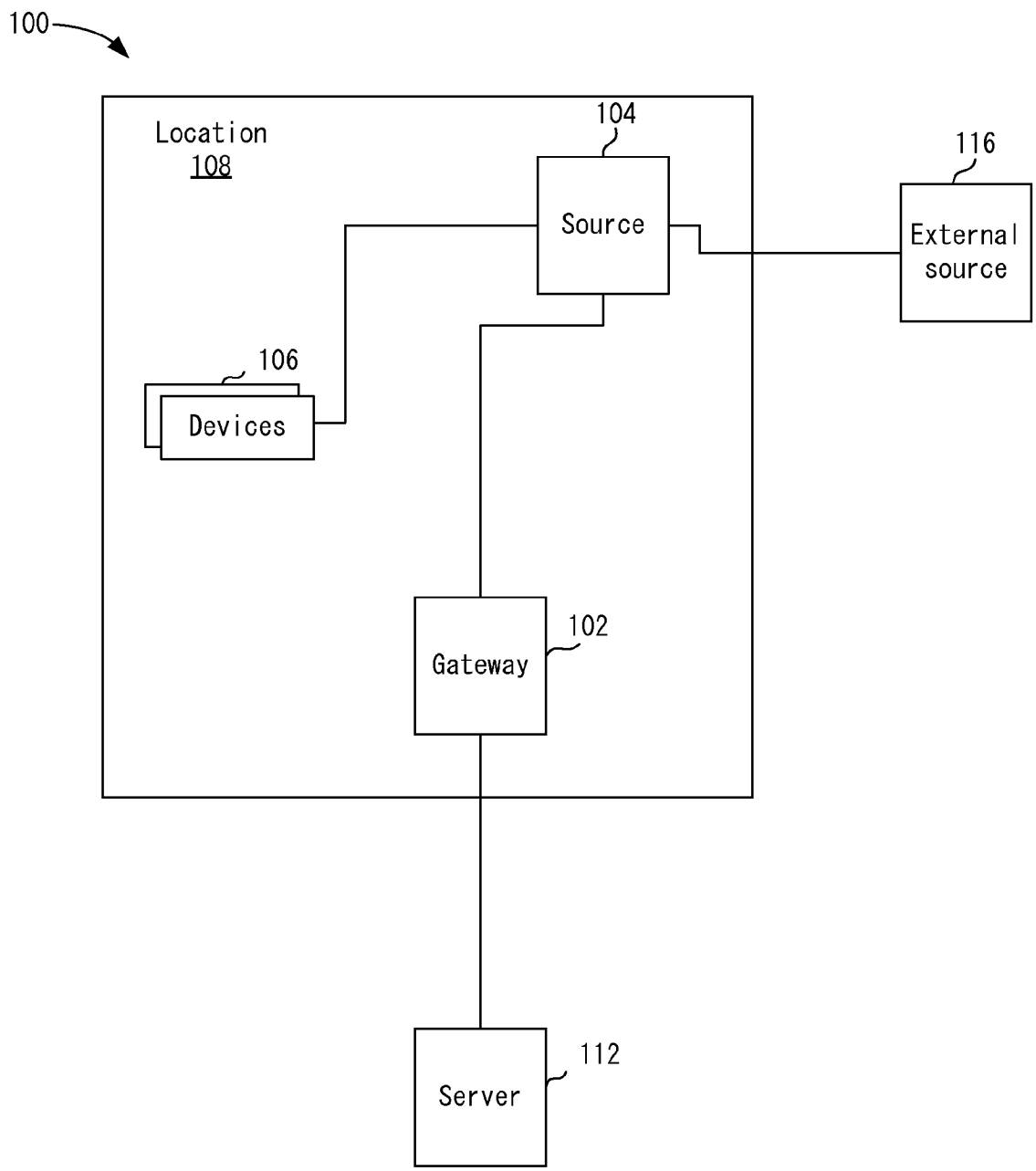
FIG. 1 depicts an example of a system for monitoring devices according to one embodiment.

FIG. 1 depicts an example of a system 100 for monitoring devices 106 according to one embodiment. System 100 includes a gateway 102 that monitors a source 104 to detect the operation of devices 106. In one example, gateway 102 and devices 106 may be found in a location 108, such as a house, business, or other area. Although one location 108 is described, multiple locations 108 may also include devices 106 that are being monitored.

Devices 106 may include electrical devices (or appliances) that may be purchased for location 108. Examples of devices 106 include lights, kitchen appliances, thermostats, and televisions. Devices 106 may be physical devices, but it will be understood that devices 106 may be virtual devices. Virtual devices may include applications running on physical devices.

In one example, devices 106 may have been purchased by a user along with a monitoring solution according to particular embodiments. For example, the monitoring solution may be referred to as a smart warranty. Purchasing of the monitoring solution triggers the monitoring of device 106 by gateway 102 at source 104 as described herein; however, the monitoring solution may be performed without any purchase by a user.

Devices 106 may be coupled to source 104. In one example, source 104 may be a power source that is providing power needed to operate device 106. In one example, source 104 is an alternating current (AC) power line that provides electricity to devices 106. The point of monitoring of source 104 may be in different areas. In one embodiment, the point of monitoring is separate from device 106. That is, gateway 102 is not connected directly to a point of device 106 that was purchases. For example, a power line in location 108 may be tapped by gateway 102. The power line may be coupled to an external source 116, which may be an external power line that supplies electricity to location 108. Also, gateway 102 may be coupled to a smart meter. Any coupling allows gateway 102 to read electrical characteristics that can be associated with device 106.

Gateway 102 is configured to monitor devices 106 even if they are associated with different entities (e.g., devices that have been manufactured, sold, or serviced by different companies)). In some cases, devices 106 operate in different ways and monitoring whether there are problems in the operation of different devices 106 may be different. For example, problems in the operation of a refrigerator may be different from problems of a light. Particular embodiments provide a generic solution that may monitor the operation of different devices 106 from source 104. Thus, gateway 102 may not need to be integrated with devices 106 or understand the entity-specific operation of devices 106 to monitor different devices 106. The monitoring process is described in more detail below.

In the monitoring solution, gateway 102 monitors characteristics of source 104. For example, events may occur at device 106 may cause variances in a characteristic at source 104. Gateway 102 monitors the variance. In one example, the electrical characteristic of source 104 is monitored. Different devices 106 may cause different variances in electrical characteristic to occur at source 104. For example, the turning on of an ice machine of a refrigerator may cause a variance in frequency, noise, or harmonics on an electrical signal of the power line. When an event occurs at device 106, gateway 102 monitors and records the variance.

In one embodiment, gateway 102 sends the monitored information of the variance to server 112 through WAN 114. Server 112 may then analyze the operation of device 106. For example, server 112 may be able to determine if a corrective action is needed for the operation of device 106 based on the monitored information. Different corrective actions will be described in more detail below, but can include notifying a user, sending service personnel to address a problem, or automatically controlling device 106 to rectify the problem.

Although particular embodiments discuss server 112 performing the analysis and corrective action, gateway 102 and/or control point 202 may also perform the analysis and corrective action. The use of server 112 may be beneficial because the analysis and corrective actions may be centralized and updated easily. However, information may also be downloaded to gateway 102 and/or control point 202 periodically to allow gateway 102 to perform the analysis.

In one embodiment, gateway 102 may be integrated with a control system that can automatically control devices 106. The automatic control may be used in performing the monitoring solution as described herein. FIG. 2 depicts a more detailed example of system 100 according to one embodiment.

Gateway 102 may communicate with devices 106 through a local area network (LAN) 110. For example, devices 106 may connect to gateway 102 through a wireless (WiFi) network or through a wired connection in location 108. Gateway 102 is also coupled to a server 112 through a wide area network (WAN) 114. In one embodiment, gateway 102 is a bridge between WAN 114 and LAN 110 for devices 106. In this case, gateway 102 is a separate device that allows the operation of devices 106 to be monitored through an external network. This may be helpful when devices 106 are not enabled to communicate through WAN 114. Also, although communication with gateway 102 through LAN 110 is described, devices 106 may not be able to communicate through LAN 110. Monitoring of the operation of devices 106 can still be performed because source 104 is monitored.

A control point 202 automatically controls devices 106. For example, control point 202 may control devices 106 by turning devices 106 off, turning devices 106 on, or adjusting settings for devices 106. In one embodiment, control point 202 communicates through LAN 110 to devices 106. Although not shown, additional controllers may be included in location 108 that bridge communication between control point 202 and devices 106.

Gateway 102 may be a separate device from control point 202. In this case, gateway 102 may communicate with control point 202 to perform actions that are described herein. In another embodiment, gateway 102 may be integrated with control point 202. For example, gateway 102 may be a software module found within control point 202.

When a device 106 is added to LAN 110, control point 202 may detect the added device 106. A setup and configuration may be performed to allow control point 202 to automatically control device 106. Also, a setup may be performed to configure gateway 102 to monitor source 104 for device 106. The setup of gateway 102 is described in more detail below.

Figure 3A:
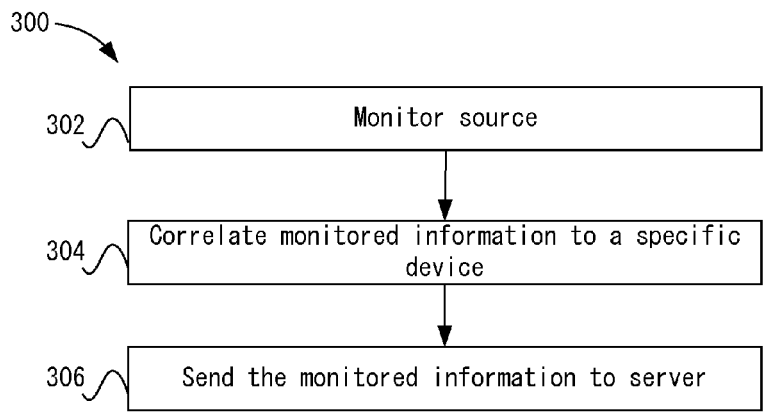
FIG. 3a depicts a simplified flowchart of a method for monitoring the operation of a device according to one embodiment.

After the initial configuration, devices 106 are monitored. FIG. 3a depicts a simplified flowchart 300 of a method for monitoring the operation of a device 106 according to one embodiment. At 302, gateway 102 monitors source 104. For example, electrical characteristics of source 104 may be monitored.

In one example, multiple devices 106 may be coupled to source 104. Thus, it is possible that different events at devices 106 may be causing variances in electrical characteristics of source 104. Accordingly, at 304, gateway 102 may correlate monitored information to a specific device 106. As will be described in more detail below, the correlation may be performed by determining a signature of device 106. For example, different devices 106 may have different signatures that are caused by events at devices 106. A signature may be a variance in an electrical characteristic, such as a specific variance in frequency on a power line may occur when a refrigerator ice maker is turned on. Gateway 102 may be able to correlate the variance to a device 106 according to signatures of devices 106.

At 306, gateway 102 sends the monitored information to server 112. Also, gateway 102 may send identification of which device 106 has been correlated to the monitored information.

Figure 3B:
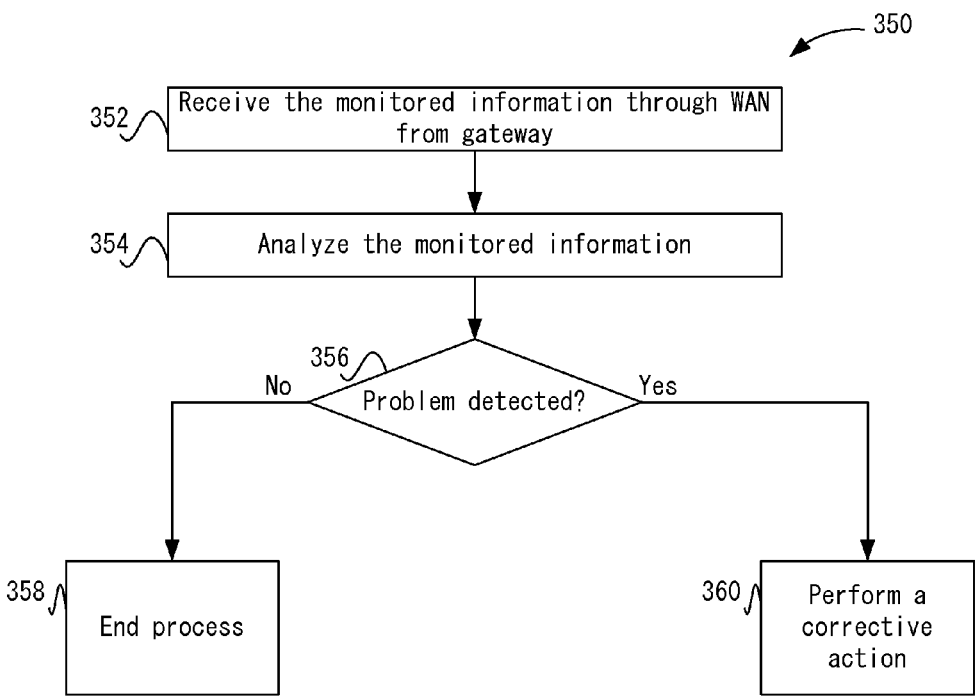
FIG. 3b depicts a simplified flowchart for analyzing monitored information according to one embodiment.

FIG. 3b depicts a simplified flowchart 350 for analyzing monitored information according to one embodiment. In one embodiment, the monitored information is analyzed at server 112; however, gateway 102 and/or control point 202 may also analyze the monitored information.

At 352, server 112 receives the monitored information through WAN 114 from gateway 102. Server 112 may be centralized device that can monitor information from multiple gateways 102 at different locations 108. This allows centralized analysis and updates to be performed.

At 354, server 112 analyzes the monitored information. For example, different thresholds for monitored information for a specific device 106 may be stored at server 112. Server 112 may compare the monitored information to the thresholds to analyze the operation of device 106. A violation of a threshold may indicate that device 106 may not be operating properly. For example, if the frequency shift of the power line goes past a threshold, it may be determined that a potential problem in the operation of device 106 may be occurring. Although thresholds are described, other ways of analyzing the monitored information may also be used.

At 356, server 112 determines if problem is detected. If not, at 358, the process may end or confirmation may be sent to gateway 102 that no problems have been found.

If an issue is found, at 360, a corrective action is performed. For example, the corrective action may include sending a notification of a problem to a user (e.g., an owner of device 106 or a customer service representative), ordering a service call to location 108, or controlling device 106 automatically to perform an action to correct the problem.

Figure 4:
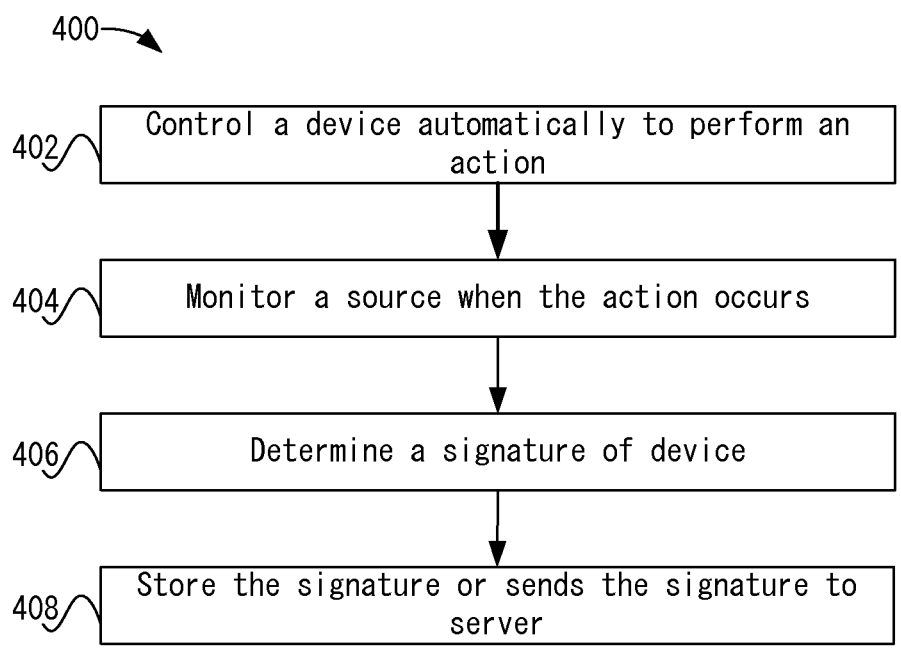
FIG. 4 depicts a simplified flowchart of a method for determining a signature for a device according to one embodiment.

As described above, signatures may be used to detect which device 106 has caused a variance in source 104 and also to detect whether a problem in operation has occurred. A configuration process may be performed to determine a signature at source 104 for a device 106. FIG. 4 depicts a simplified flowchart 400 of a method for determining a signature for a device 106 according to one embodiment. At 402, control point 202 controls a device 106 automatically to perform an event. For example, control point 202 may turn on a device 106, activate a feature of device 106, or turn off device 106. In one example, a refrigerator icemaker may be turned on to monitor the operation of the icemaker. In another embodiment, user may be prompted to control device 106 to perform an act. For example, control point 202 may communicate with a user interface to output instructions on what a user should do to cause device 106 to perform the action. In this case, instructions are output on the user interface asking the user to turn on the icemaker and select an input on the user interface when the icemaker is turned on. This allows control point 202 to determine when the icemaker is turned on.

At 404, gateway 102 monitors source 104 when the event occurs. For example, electrical characteristics are monitored before the event, during the event, and after the event.

At 406, gateway 102 determines a signature of device 106. For example, the variations in the electrical characteristics of power source 102 that occur as a result of the event are measured and quantified.

At 408, gateway 102 stores the signature or sends the signature to server 112. The signature may be referenced to the specific device 106 and event. Thus, when an analysis of the signature is performed, it is known that a specific event has occurred at a specific device 106 and resulted in a variation in source 104. This is used to analyze the operation of device 106 at a later time.

Figure 5A:
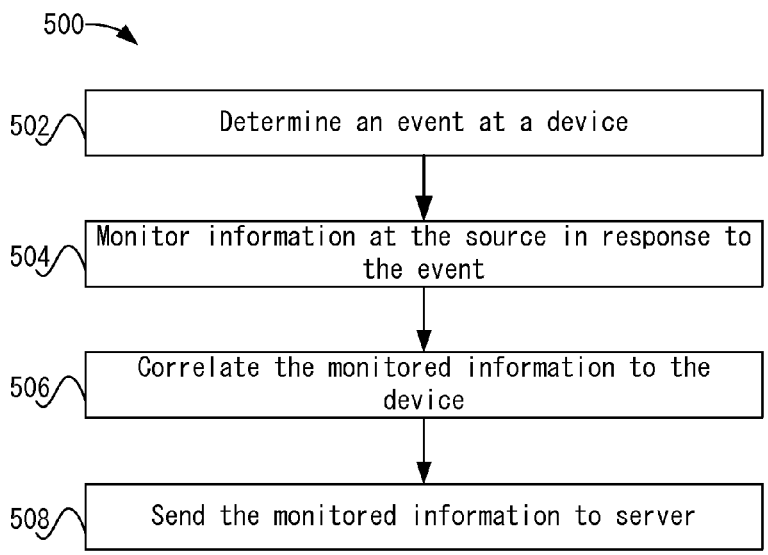
FIG. 5a depicts a simplified flowchart of a method for monitoring a source and correlating monitored information to a device according to one embodiment.

The monitoring and analysis using the signatures will now be described. FIG. 5a depicts a simplified flowchart 500 of a method for monitoring source 104 and correlating monitored information to a device 106 according to one embodiment. At 502, gateway 102 determines an event at device 106. For example, control point 202 may detect that an event has occurred. In one example, a user may have turned on a device 106 or device 106 (or a feature of device 106) may automatically turn on. In another embodiment, control point 202 may be automatically controlling device 106 to cause the event to occur. Control point 202 can determine the event occurred because control point 202 is coupled to devices 106 through LAN 110.

At 504, gateway 102 monitors information at source 104 in response to the event. For example, the variation in an electrical characteristic of source 104 may be monitored.

At 506, gateway 102 correlates the monitored information to specific device 106. For example, if control point 202 has detected the event, then gateway 102 can determine that the monitored information is associated with device 106 based on the time of the event occurring. In another example, gateway 102 may not need to detect an event at device 106 to perform the correlation. Rather, the monitored information may be compared to stored signatures to correlate the monitored information to a device 106. Even though variations in the signature may exist, slight variations may be interpolated to be associated with a specific device 106.

At 508, gateway 102 sends the monitored information to server 112. The correlation may also be sent to server 102. The correlation may be performed at gateway 102 because signatures may be different for a device 106 in different locations 108 due to different electrical systems being used in different locations 106. The correlation may also be performed at gateway 102 because different signatures result for a device 106 based on what types of devices 106 are connected to source 104. For example, a refrigerator may have a different signature if a light is also connected to source 104 than if a coffee maker is connected to source 104. In other embodiments, gateway 102 the correlation may be performed at server 112. In this case, gateway 102 may have sent the signatures to server 112.

Figure 5B:
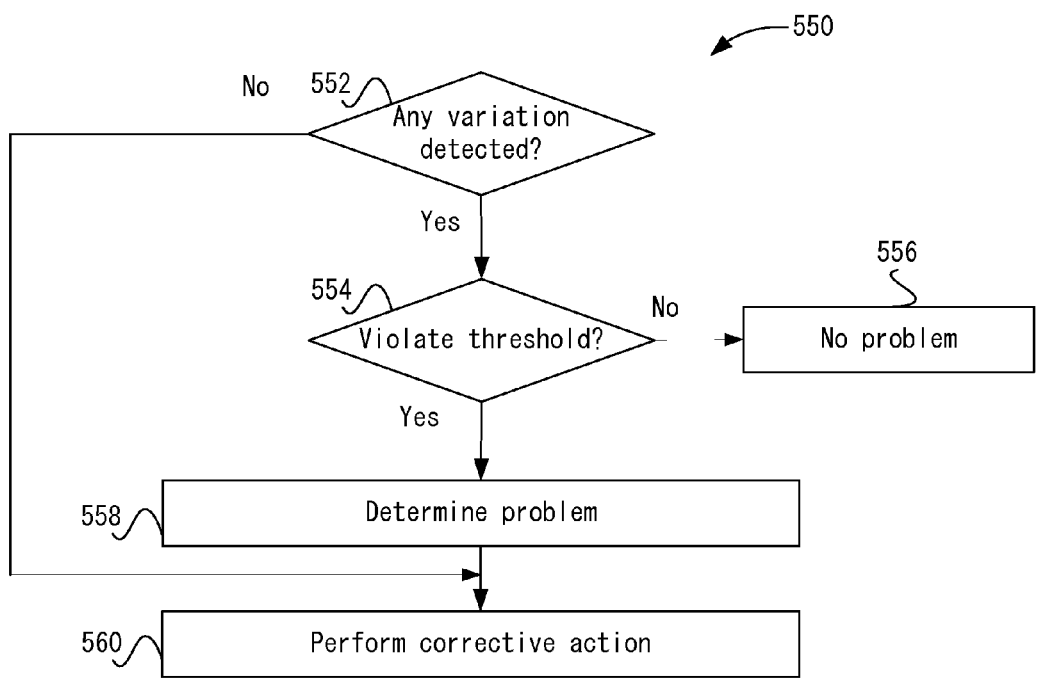
FIG. 5b depicts a simplified flowchart for analyzing operation of the device according to one embodiment.

FIG. 5b depicts a simplified flowchart 550 for analyzing operation of device 106 according to one embodiment. Although FIG. 5b is discussed with respect to server 112, the method may be performed on gateway 102 and/or control point 202.

At 552, server 112 determines if any variation for device 106 has been detected in the monitored information. For example, based on the event occurring at device 106, the characteristic is monitored and no variation may occur (e.g., a request to turn on the icemaker is performed but the ice maker does not actually turn on). If no variation has occurred, at 560, a corrective action is performed based on no variation being detected. For example, it may be inferred that device 106 did not perform the action at all. If not variation occurred, then a signature of device 106 may not have been detected at gateway 102. However, the detection of the event occurring at device 106 is leveraged to perform the correlation. For example, the request to turn on the ice maker is detected at control point 202, which then relays the request to gateway 102. Gateway 102 can then correlate monitored information to the event.

At 554, if a variation was detected, server 112 determines if the monitored information violates a threshold. For example, the monitored information may vary, but may be within an acceptable range of operation. If the monitored variation is in the acceptable range of operation, at 556, no problem is found. No action may be taken or confirmation may be sent to gateway 102 that device 106 is operating properly.

If the threshold is violated, at 558, a problem is determined An example of a threshold violation may be when the amount of load necessary to operate device 106 increases by a measurable value. For example, a refrigerator's load may increase due to the need to clean the coils on the refrigerator. The refrigerator uses cooling coils to exchange heat carried by the coolant with the ambient air. If the coils are dirty, then the amount of heat transfer becomes much less, as the heat stays in the coolant. This will cause a cooling system that is attempting to cool the refrigerator to a certain temperature to run longer and more often, as well as shorten the life of components in the cooling system. At 560, a corrective action may be performed.

Figure 6:
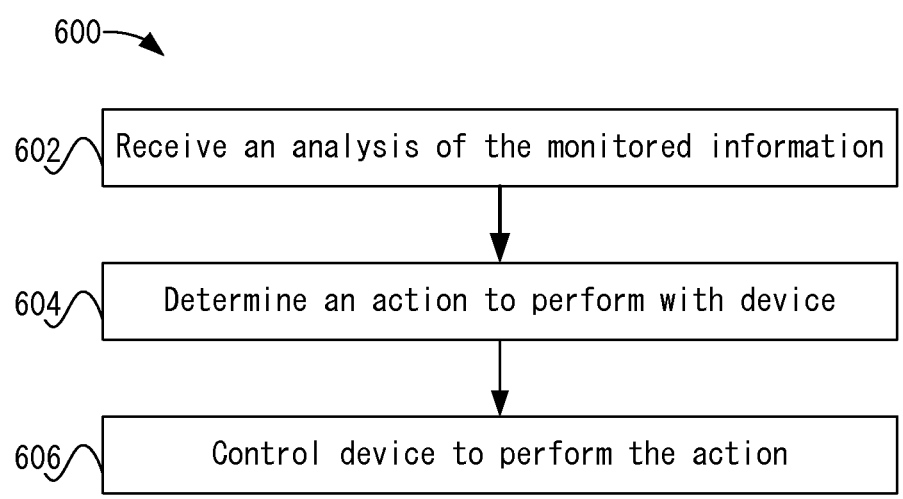
FIG. 6 depicts a simplified flowchart of a method for performing a corrective action according to one embodiment.

After analysis, the corrective action may be performed. FIG. 6 depicts a simplified flowchart 600 of a method for performing a corrective action according to one embodiment. At 602, gateway 102 receives an analysis of the monitored information. The analysis may indicate that a problem has been detected.

At 604, gateway 102 determines an action to perform with device 106. For example, the action to perform may have been determined by server 112 and transmitted to gateway 102. In another embodiment, gateway 102 may determine the action to perform based on the analysis received.

At 606, device 106 is controlled to perform the action. For example, gateway 102 may communicate with control point 202 to have device 106 automatically controlled to perform the action. In one example, if the icemaker is not operating optimally, the icemaker may be reset. In another example, if an air conditioning unit is detected as continuously cycling on/off, the cause could be the thermostat. A command could be sent by control point 202 to reset the thermostat controller so as to stop the continuous on/off cycling due to thermostat controller disoperation. The cycling air conditioner is at a greater risk for failure as the unit is electrically stressed with continuous starts and stops. Resetting the thermostat could remove that risk, and thus ensuring a longer life for the air conditioning unit.

Accordingly, by having control point 202 coupled to devices 106, automatic corrective actions may be performed. In other embodiments, a control point 202 may output instructions to a user on a user interface to perform the corrective action.

In one example, particular embodiments may be used as a smart warranty. The smart warranty may be where the user purchases the smart warranty at a point of sale. The smart warranty includes the monitoring solution described above. In this case, instead of waiting until the failure of a device 106, the smart warranty monitors device 106 and can notify or provide a corrective action before the failure of device 106. This may also extend the life of device 106.

Figure 7:
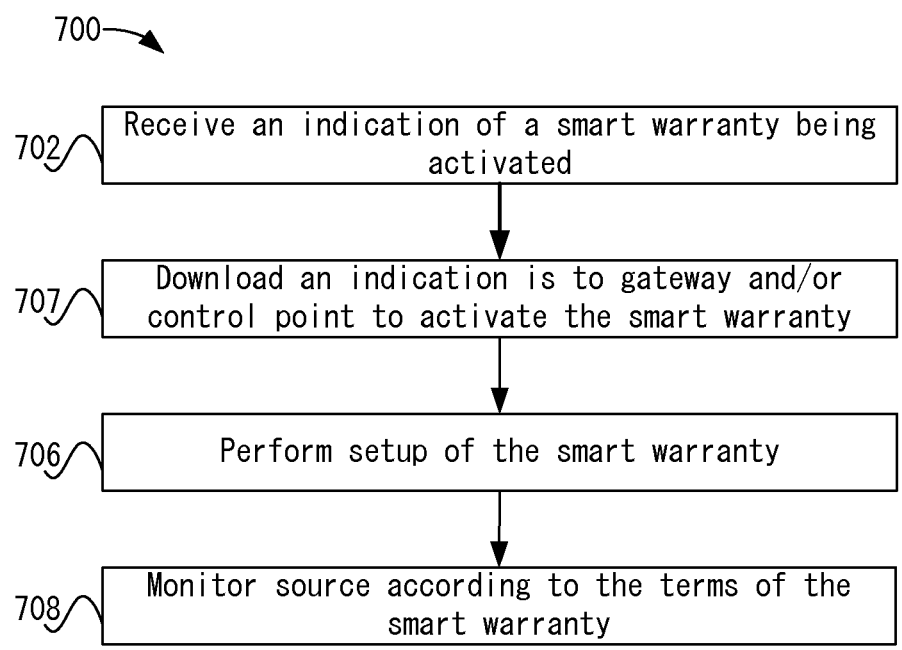
FIG. 7 depicts a simplified flowchart of a method for setting up a smart warranty according to one embodiment.

FIG. 7 depicts a simplified flowchart 700 of a method for setting up a smart warranty according to one embodiment. At 702, gateway 102 receives an indication of a smart warranty being activated. For example, at a point of sale (POS), the user may purchase device 106 and also indicate a desire to purchase the smart warranty. If a user does not have a gateway 102, gateway 102 may also be purchased/provided for installation.

At 704, an indication is downloaded to gateway 102 and/or control point 202 to activate the smart warranty. In one example, if gateway 102 is a separate device, gateway 102 may be installed in location 108. Also, if gateway 102 has already been installed for a smart warranty for another device 106, then the same gateway 102 may be used to service another smart warranty.

At 706, setup of the smart warranty is performed. In one example, a setup may include coupling device 106 to control point 202 and/or gateway 102. Then, operation of device 106 is configured such that device 106 can be controlled using control point 202. Additionally, device 106 is coupled to source 104. Then, the setup to determine the signature of device 106 may be performed.

At 708, gateway 102 monitors source 104 according to the terms of the smart warranty. For example, the smart warranty may indicate which characteristics to monitor for device 106. Additionally, the smart warranty may indicate information to store, such as status reports, health logs, or other reports to prolong the life of device 106.

Figure 8:
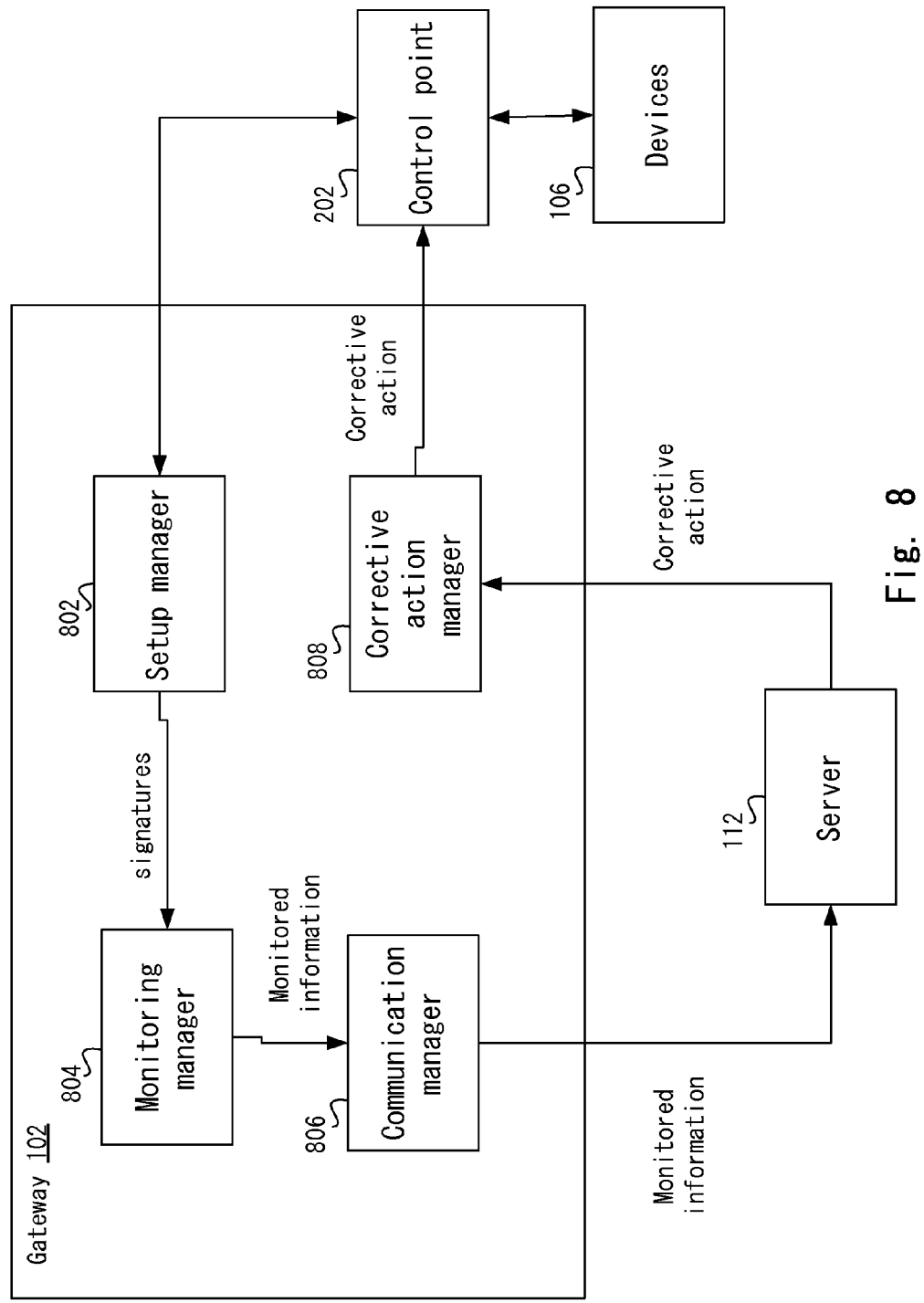
FIG. 8 depicts a more detailed example of a gateway according to one embodiment.

FIG. 8 depicts a more detailed example of gateway 102 according to one embodiment. A setup manager 802 is used to set up devices 106. The setup may include determining signatures for devices 106.

A monitoring manager 804 monitors source 106 as described above. Monitored information may be determined A communication manager 806 then sends the monitored information to server 112. Server 112 performs an analysis of the monitored information and can determine a corrective action.

A corrective action manager 808 receives the corrective action. Corrective action manager 808 may then communicate with control point 202 to have the corrective action performed with respect to devices 106.

Accordingly, particular embodiments provide many advantages. For example, monitoring of devices 106 may be performed to prolong the life of devices 106. Corrective actions may also be performed before the failure of devices 106. The automatic control of devices 106 may be leveraged to set up the monitoring solution and also perform corrective actions.

The monitoring solution also monitors devices 106 at a separate source 104. This also allows gateway 102 to monitor multiple devices 106 that are associated with different entities. Further, this allows generic monitoring of different devices 106 because actions of devices 106 can be correlated to variances in characteristics of source 104.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for monitoring the operation of a device, the method comprising:
  monitoring the operation of the device via a monitoring device configured to monitor one or more electrical characteristics of an alternating current (AC) power source, wherein the AC power source is coupled to the device and configured to supply power to the device for operation;
  detecting variations of the one or more electrical characteristics at the AC power source when an event occurs at the device; and
  correlating the variations as being associated with the device, wherein the variations comprise an indication of whether the device is functioning or malfunctioning.

2. The method of claim 1, comprising providing the indication of whether the device is functioning or malfunctioning to a server over a network.

3. The method of claim 1, comprising:
  automatically controlling the operation of the device to rectify the operation of the device when the device is malfunctioning.

4. The method of claim 1, comprising automatically controlling the operation of the device to perform the event at a time, and wherein correlating the variations comprises associating the control of the operation of the device to the variations at the time.

5. The method of claim 1, wherein during a set up process:
  determining that the event has occurred at the device; and
  monitoring the AC power source to measure the variations of the one or more electrical characteristics in response to the event being detected, wherein the measured variations are utilized to determine a threshold.

6. The method of claim 5, comprising storing the threshold for use in determining whether the device is functioning or malfunctioning.

7. The method of claim 5, comprising:
  automatically controlling the device to cause the event to occur; and
  monitoring the AC power source to detect the measured variations upon detecting that the event has occurred.

8. The method of claim 1, comprising: upon purchase of a monitoring solution for the device, downloading information to the monitoring device to monitor the device at the AC power source upon connection of the device to the AC power source.

9. The method of claim 1, wherein the AC power source is monitored by the monitoring device at a point separate from the device.

10. The method of claim 1, comprising utilizing a gateway to automatically control the device when the variations cross a threshold.

11. The method of claim 1, wherein:
  a plurality of devices are coupled to the source, and wherein the variations are correlated to the device in the plurality of devices based on the variations being correlated to the event.

12. The method of claim 11, wherein:
  the plurality of devices are associated with different entities, and wherein monitoring the one or more electrical characteristics at the AC power source comprises monitoring the plurality of devices via a single monitoring device.

13. An electronic device configured to monitor an operation of a device, comprising:
  one or more processors configured to:
    monitor the operation of the device by monitoring one or more electrical characteristics of an alternating current (AC) power source, wherein the AC power source is coupled to the device and configured to supply power to the the device for operation;
    detect variations of the one or more electrical characteristics at the AC power source when an event occurs at the device; and
    correlate the detected variations as being associated with the device, wherein the detected variations comprise an indication of whether the device is functioning or malfunctioning.

14. The electronic device of claim 13, wherein the one or more processors are configured to provide the indication of whether the device is functioning or malfunctioning to a server over a network.

15. The electronic device of claim 13, wherein the one or more processors are configured to:
  automatically control the operation of the device to rectify the operation of the device when the device is malfunctioning.

16. The electronic device of claim 13, wherein the one or more processors are configured to:
  determine that the event has occurred at the device; and
  monitor the AC power source to measure the variations of the one or more electrical characteristics in response to the event being detected, wherein the measured variations are utilized to determine a threshold.

17. A non-transitory computer-readable storage medium comprising instructions for monitoring an operation of a device, the instructions for controlling a computer system to be operable to:
  Monitor the operation of the device by monitoring one or more electrical characteristics of an alternating current (AC) power source, wherein the AC power source is coupled to the device and configured to supply power to the device for operation;
  detect variations of the one or more electrical characteristics at the AC power source when an event occurs at the device; and
  correlate the variations as being associated with the device, wherein the variations comprise an indication of whether the device is functioning or malfunctioning.

18. The method of claim 1, wherein detecting variations of the one or more electrical characteristics at the AC power source comprises detecting a variation of a frequency parameter, a noise parameter, frequency harmonics parameters, or a combination thereof.

19. The method of claim 1, wherein detecting variations of the one or more electrical characteristics at the AC power source comprises determining whether one or more of the variations crosses a threshold.

20. The method of claim 19, comprising performing a control action via a control device to control the operation of the device when one or more of the variations crosses the threshold.

* * * * *